United States Patent Office 3,733,220
Patented May 15, 1973

3,733,220
WATER ACTIVATED LEAD-ACID BATTERY HAVING DRIED, DISCHARGED ELECTRODES
Nicholas J. Cortese, Racine, Wis., and James E. Bell, Fairview Park, Ohio, assignors to ESB Incorporated
Filed Mar. 3, 1971, Ser. No. 120,426
Int. Cl. H01m *39/00*
U.S. Cl. 136—26    4 Claims

ABSTRACT OF THE DISCLOSURE

A lead-acid battery is produced by: charging the electrodes to a state of substantially full charge in a formation tank; discharging the electrodes to a state of substantially complete discharge in the formation tank; drying the electrodes; assembling the dried, discharged electrodes into elements; coating the exposed areas of elemental lead in the element, particularly the surfaces of the positive connective strap, with a non-oxidizing material or, alternatively, oxidizing those exposed areas of elemental lead with an oxidizing agent; and, placing the element into a battery container. Enough $PbSO_4$ may be contained in the dry, discharged electrodes so that the battery can be activated by the addition of water.

BACKGROUND OF THE INVENTION

In the manufacture of lead-acid batteries of the type used in automobiles, the positive and negative electrodes are produced by spreading onto grids a paste which contains a lead compound active material comprising mainly PbO (minor quantities of $PbSO_4$ are also present). Frequently a pair of grids are cast with a structural connection between them, and the active material paste is applied to these "twin" grids; at some subsequent step in the assembly of the battery the connection in the twin pasted grid is broken so that two pasted electrodes result.

After the paste is applied the electrodes are immersed into sulfuric acid where there is an immediate chemical reaction in the electrodes of both polarity,

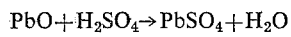

The electrodes are then "formed" or "charged," a step in which the $PbSO_4$ is electrochemically converted into a higher oxidation state, $PbO_2$, in the positive electrodes and into a lower oxidation state, Pb, in the negative electrodes. The cell reactions are

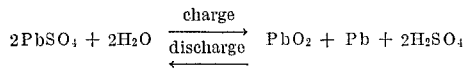

After being "formed," the electrodes are dried, with one or more washing steps usually preceding the drying.

Another step in the manufacture of the batteries is one in which the electrodes are assembled into elements. An element comprises a plurality of positive electrodes connected together by a positive connecting strap and a plurality of negative electrodes connected together by a negative-connecting strap, the positive and negative electrodes being alternately spaced and separated from one another by appropriate separators. The elements are then placed into battery containers. Assembly of the positive and negative electrodes into elements may occur before or after the electrodes are formed.

Automotive batteries having dried, charged electrodes have been used for many years. These batteries, which are produced by drying the electrodes after they have been charged in the factory, are shipped without the liquid sulfuric acid electrolyte in them, a feature which saves freight, reduces handling hazards, and contributes to longer shelf life of the batteries. The batteries may be activated just before being placed in service by adding the liquid acid electrolyte; usually the battery is given a short booster charge after the electrolyte has been added.

A long-standing industry objective has been to produce a lead-acid, automotive type battery having dried electrodes which could be activated by the addition of water rather than sulfuric acid. To achieve this objective, of course, it is necessary to store somewhere inside the battery either concentrated liquid sulfuric acid or some solid or gelatinous, sulfate ion containing material which in the presence of water will produce sulfuric acid of sufficient concentration to serve as the battery's electrolyte. One of the difficulties with this general approach, however, is that the space available inside the container is severely limited, and simply increasing the dimensions of the container to increase the storage space for electrolyte. One of the difficulties with this general approach, soluiton. One of the big efforts of the internal storage approach, then, is to use every available measure of space inside the container.

It has been previously recognized that one location inside a dry battery where sulfate ion precursors might be stored is in the electrodes themselves. As mentioned above, the discharged active material in both the positive and negative electrodes comprises $PbSO_4$. Knowledge of this fact suggests the possibility that a lead-acid type battery having dried electrodes and capable of being activated by the addition of only water could be produced by discharging the electrodes sufficiently during the formation so that they and they alone contain sufficient $PbSO_4$ to produce the required electrolyte upon the addition of water and charging. To achieve the necessary quantity of $PbSO_4$ in the electrodes it might be necessary to discharge the electrodes to a state of substantially complete discharge. It would be expected that batteries made in this manner would have to be charged after water is added and before the batteries are placed into service.

Our discovery and invention resulted from an attempt to produce batteries having dried, discharged electrodes which could be activated by the addition of water followed by a charging. The events leading to the discovery and invention will be related to provide an understanding.

We began by applying mixtures of positive and negative electrode paste to structurally connected grids analogous to the "twin" grids described above. While still in the structurally connected condition and before being assembled into elements, these electrodes were immersed into the sulfuric acid of a formation tank and "formed" or "cycled" for one cycle, the formation ending when the electrodes had been discharged to a state of substantially complete discharge. After being formed the electrodes were dried, the structurally connected electrodes were sawed apart to produce single, dried, discharged electrodes, and the electrodes were assembled into elements. When in the elements, the positive electrodes were connected together by positive connecting straps made from an alloy of elemental lead and minor quantities of other metals such an antimony, tin, arsenic, and copper; the negative electrodes were similarly connected by negative strap connectors. The elements were then placed into battery containers.

When we attempted to activate our batteries by adding water and charging, an unexpected problem was encountered. We discovered that the elements would not accept a charge. Close investigation during attempts to activate many batteries in this way led to the observation that crystals of gray material were being produced which extended from the negative electrodes through and/or over the separators to the positive strap connector. These crystals apperaed very soon after water was added and the attempt to charge was begun. Concurrently we observed that a thin film of white material was produced on the surfaces of the positive connecting straps. Pursuing these observations further, it was discovered that the elements would accept the charge if the gray crystals could be prevented from occurring.

SUMMARY OF THE INVENTION

Our invention consists of the discovery of the combination of steps which, if taken, will allow a lead-acid battery having dried, discharged electrodes to be charged after the addition of only water.

The most important of these steps is one which prevents the gray crystals and the white film from occurring. This accomplishment may be achieved either by coating the exposed areas of elemental lead, and particularly the surfaces of the positive strap connectors, with a non-oxidizing material or, alternatively, by oxidizing those exposed areas of elemental lead with an oxidizing agent. We speculate that without this coating lead will begin to dissolve from the exposed surfaces of the elemental lead in the positive strap connector as soon as the charging current is turned on. The resultant lead ions rapidly migrate to the negative electrodes where they are oxidized to produce "dendrite," a crystalline form of pure lead. The dendrite crystals, which begin growing on the surfaces of the negative electrodes, rapidly grow and quickly extend through and/or over the separators to the positive strap connectors, causing an internal electrical short within the element. This shorting occurs very rapidly and before very much of a charge can be given to the electrodes. We believe it is important to coat the exposed surfaces of elemental lead in the positive strap connectors and in the positive electrodes so that the elemental lead will not dissolve from those surfaces and eventually produce the undesired crystal bridges.

Another step which we feel is important is to dry the electrodes immediately after they have been fully discharged in the formation of cycling process, e.g., to dry the discharged electrodes without first washing them. By this preferred process some of the sulfuric acid from the formation tank will remain in the "dried" electrodes, even though the electrodes have been made as "dry" as they usually are in conventional drying processes and even though the electrodes have the appearance of being fully dry. We feel it is very desirable for two reasons to leave this small, residual amount of sulfuric acid in the "dried" electrodes, for that acid can quickly be mixed with the water when the water is added. First, without this small amount of sulfuric acid it is difficult to charge the elements except at the higher voltages which are not available in the charging systems used by many people. Water, which is the only liquid to be added to activate the battery, is a much poorer conductor of electrical current than is a dilute solution of sulfuric acid, and to be able to get the charging started using a low voltage charging circuit it is necessary to increase the conductivity of the liquid inside the battery; this improved conductivity results by the creation of a dilute acid solution before charging is started. The second reason for wanting the residual sulfuric acid present in the "dried" electrodes is that the dilute acid solution which is produced by the addition of water tends also to prevent the occurence of the "dendrite" crystals.

Our invention is applicable to batteries in which the electrodes are formed in formation tanks before being assembled into elements. In that case the positive strap connectors which are part of the elements are not present during formation and therefore do not have the opportunity to develop a coating of $PbO_2$ on their surfaces. Our invention is also applicable to batteries in which the electrodes were formed while halves of "twin" electrodes; when these "twin" electrodes are snapped apart after drying, areas of elemental lead are exposed where the two twin grids had previously been connected together.

Our invention is applicable to lead-acid batteries having dried electrodes which have been discharged sufficiently so that they contain enough $PbSO_4$ to permit the battery to be activated by the addition of water followed by charging. Such batteries may include those in which the electrodes are charged to a state of substantially full charge and are then discharged to a state of substantially complete discharge.

DESCRIPTION OF THE PREFERRED EMBODIMENT

This invention concerns lead-acid batteries which are manufactured by a particular process.

Figure 1:
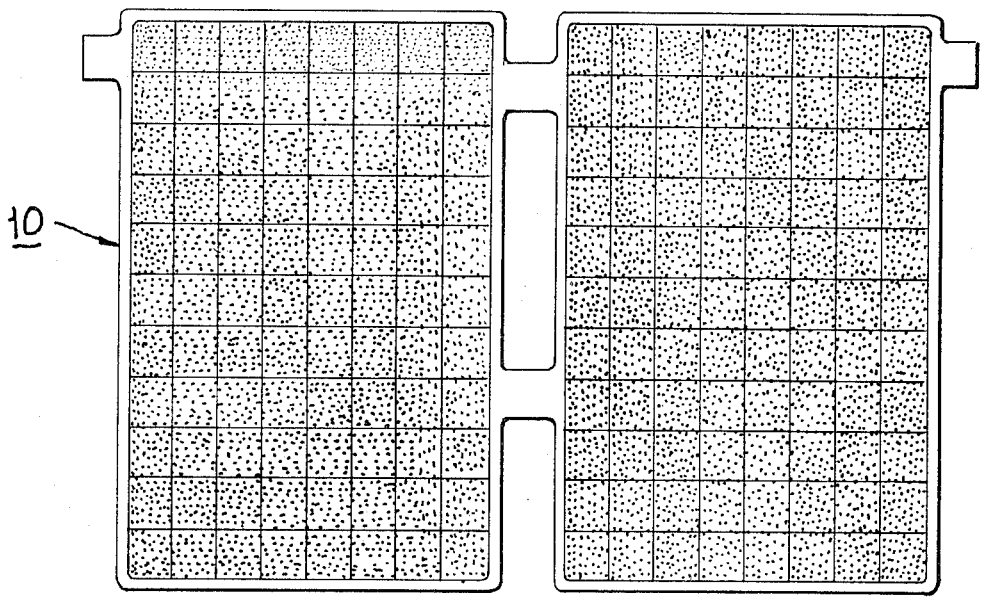
FIG. 1 shows a "twin" electrode.

The process begins by applying active material pastes to grids. As mentioned in the Background, these pastes consist mainly of PbO particles, although minor quantities of $PbSO_4$ and other ingredients are usually also present. The grids may be individual ones or they may be of the "twin" type illustrated in the twin electrodes 10 shown in FIG. 1.

After the active material paste has been applied to the grids, the resulting electrodes are immersed into the sulfuric acid solution of a formation tank where they are "formed" or "cycled," a step in which the electrodes are charged and then discharged. Several cycles of charging and discharging in the formation tank may be performed if desired. The formation is ended after the electrodes have been discharged so that they contain a high proportion of $PbSO_4$ in their action materials.

The electrodes are dried after being formed. For the reasons given above we prefer not to wash the electrodes between the formation and drying steps, although the electrodes may be washed if it is known that the finished battery will be activated using a high voltage charger.

If the electrodes were produced by applying paste onto twin grids, the resultant twin electrodes (FIG. 1) may remain as connected twins throughout the forming and drying steps. The advantages of processing twin rather than individual electrodes include reducing by one-half the number of separate components being handled during certain process steps plus causing the electrodes to be symmetrical about their connections, a feature which facilitates handling of the electrodes by machinery. After being dried the twin electrodes may be broken in two by a simple snap action. The twin electrodes may also be broken in two before formation, although it is usually desirable to postpone breaking until after drying for the reasons given.

Figure 2:
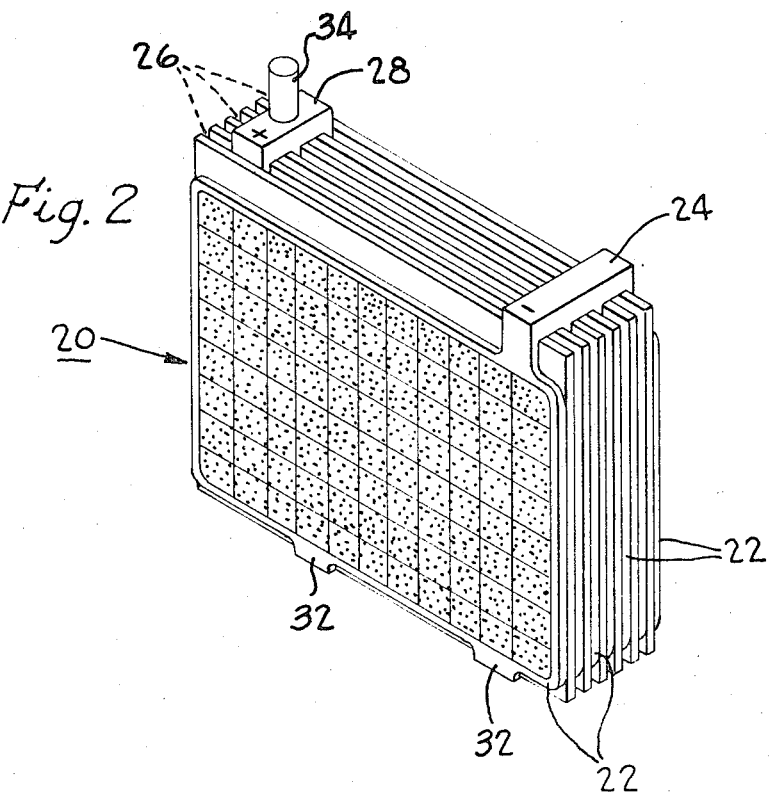
FIG. 2 shows an element for a lead-acid battery.

After being dried, the discharged electrodes are then assembled into elements 20 such as the one shown in FIG. 2. An element comprises a plurality of positive electrodes 22 which are mechanically and electrically connected by a positive connecting strap 28 plus negative electrodes 26 which are similarly joined by a negative connecting strap 24. Separators 30 are usually placed between adjacent pairs of electrodes and are components of the elements.

We have found that steps may be taken which prevent the undesired crystal bridge from being produced but which do not conflict with the initial goal of producing a battery having dried, discharged electrodes that can be activated by the addition of water followed by charging. In general, the preventive steps are of two alternative types. With the first, certain exposed area of elemental lead are coated with a non-oxidizing material so that those areas are no longer exposed. The other alternative consists of oxidizing those exposed areas with an oxidizing agent. These exposed surfaces which require coating or oxidation appear on the positive strap connectors, the areas 32 (if any) in the positive electrodes which are exposed by snapping the twin electrodes in half, and some or all of the positive terminal post 34. The corresponding exposed surfaces of the negative strap connectors, electrodes, and terminal do not appear to require such coating, although we have not yet determined whether there is some marginal benefit in coating those surfaces.

We believe there are many non-oxidiizng materials which can be used in the first alternative solution to the problem we encountered. It is common during assembling and subsequent handling of the elements to mark a spot on the positive connecting straps 28 with a crayon for easy visual distinction between the positive and negative connecting straps; we have found that this crayon marking is sufficient to provide the required coating. The essential requirements of the coating material are that it prevent lead from dissolving from the exposed surfaces into water without producing adverse effects in the battery. We believe that a great many different non-oxidizing materials may be used, and the first alternative solution does not appear to be restricted to only one, two, or a few specific materials. The effective coating materials may be applied to the exposed areas of elemental lead in any convenient manner. It appears that the non-oxidizing material should be one which adheres well to the exposed areas so that it does not peel off easily. It should be pointed out that connecting straps have previously been coated with well-adhering coatings such as a commercially available phenolic coating sold under the trademark "Heresite VR–502," but the purpose of the coatings was to prevent metals such as antimony from leaching from the positive connecting straps, migrating to the negative electrodes, and producing an electrochemical "local action" with the negative electrodes.

The alternative solution to the problem is to oxidize the exposed areas with an oxidizing agent. In a battery assembly process in which electrodes are assembled into elements before being formed or cycled, the exposed areas of elemental lead would be oxidized during the subsequent formation and the offensive deposit would not occur in the battery when water is added. The same result may be achieved in batteries having electrodes which were formed and dried before being assembled into elements by subjecting the exposed, sensitive free lead surfaces to an analagous oxidation. Again there appears to be a number of materials which may be used as the oxidizers. A simple coating of the exposed surfaces with liquid sulfuric acid appears sufficient to produce the required surface oxidization. The oxidizing agents may be applied in any convenient manner, including methods such as spraying or brushing.

We have tried to activate and charge batteries which do not have the non-oxidizing coatings or oxidized surfaces by adding either ordinary tap water or distilled water, and we found that the problems which we have described occurred in both cases.

The problems we discovered and solved can be avoided by adding a solution of sulfuric acid rather than just water to the battery to activate it. Thus the dry, charged batteries which have been produced for years and which are activated by the addition of acid do not experience the problem we discovered. To require that the battery be activated by addition of sulfuric acid in order that it can be given an initial charge before being useful is, however, to admit defeat in the attempt to overcome the long standing problems associated with acid-handling. To the extent that it is safer and much easier for the person activating the battery to do so by adding water instead of acid solutions, a water activated battery is preferable and suitable for many more consumer applications.

As we have indicated, it is desirable to have the electrodes discharged sufficiently so that by themselves they contain enough $PbSO_4$ to permit the battery to be activated by addition of just water. Two points should be made in this connection. First, substantially complete discharge of the electrodes may be required in order to produce in the discharged electrodes enough $PbSO_4$ so that the battery can be activated by the addition of water. In constructions where the water activation objective can be achieved without complete discharge, a partial discharge is to be preferred. In the broadest sense, these partially discharged electrodes are included in the expression "discharged electrodes." The other point to be made is that precursors of sulfuric acid other than the $PbSO_4$ contained in the discharged electrodes may also be used with this invention if necessary. To the extent that the problem which was discovered and solved by this invention is associated with those batteries having internal acid precursors not in the electrodes, this invention is applicable to those batteries also.

We should remark that it has previously been known that if lead-acid batteries having sulfuric acid in them are sufficiently discharged so that all of the acid electrolyte is converted into water, then recharging of the batteries is difficult to achieve. These difficulties result from the facts that the resultant water has such high electrical resistance that very high charging voltages are required and also that the lead in the discharged negative electrodes dissolves, penetrates the separators, and causes short circuits between positive and negative electrodes. People whose batteries are discharged this deeply often discard the batteries. So far as we know, however, the problems which we encountered with a dry battery having discharged electrodes which were to be activated by the addition of water has not previously been observed.

We claim:
1. A lead-acid type battery comprising the combination of:
   (a) a battery container; and,
   (b) an element inside the container, the element comprising a plurality of dried positive electrodes connected together by a positive connecting strap and a plurality of dried negative electrodes connected together by a negative connecting strap, the positive and negative electrodes being substantially completely discharged and containing enough $PbSO_4$ so that the battery can be activated by the addition of water, the element also containing areas of elemental lead which are coated sufficiently with a non-oxidizing material so that those areas will not be exposed to water upon the addition of water to the battery.

2. The battery of claim 1 in which the areas of elemental lead which are coated with a non-oxidizing material are the surfaces of the positive connecting strap.

3. The battery of claim 1 in which the areas of elemental lead which are coated with a non-oxidizing material are at the bottom of the element.

4. The battery of claim 1 in which the positive and negative electrodes comprise $PbSO_4$ active material pasted onto grids and in which the areas of elemental lead which are coated with a non-oxidizing material are at the bottoms of the grids.

References Cited

UNITED STATES PATENTS

| | | | |
|---|---|---|---|
| 1,801,282 | 4/1931 | McLeon | 136—163 |
| 2,159,854 | 5/1939 | Jourdan et al. | 136—163 |
| 2,246,060 | 6/1941 | Newhouse | 136—163 |
| 2,747,008 | 5/1956 | Sundberg et al. | 136—27 |
| 3,305,396 | 2/1967 | Router | 136—27 |
| 3,468,721 | 9/1969 | Dickover et al. | 136—163 |
| 3,536,531 | 10/1970 | Sekido et al. | 136—27 |
| 3,607,408 | 9/1971 | Duddy | 136—27 |

WINSTON A. DOUGLAS, Primary Examiner

C. F. LEFAVOUR, Assistant Examiner

U.S. Cl. X.R.

136—134